(12) United States Patent
Chen et al.

(10) Patent No.: US 10,021,642 B2
(45) Date of Patent: Jul. 10, 2018

(54) TIMING CONTROL METHOD AND COMMUNICATION DEVICE

(71) Applicant: MediaTek Inc., Hsin-Chu (TW)

(72) Inventors: Hsi-Hsien Chen, Changhua (TW); Fu-Shing Ju, Keelung (TW); Chih-Ping Lin, Wandan Township, Pingtung County (TW); Tsung-Cheng Yang, Zhubei (TW); Tsung-Huan Cheng, Taichung (TW); Ming-Fong Jhang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 351 days.

(21) Appl. No.: 14/829,988

(22) Filed: Aug. 19, 2015

(65) Prior Publication Data

US 2016/0105849 A1 Apr. 14, 2016

Related U.S. Application Data

(60) Provisional application No. 62/061,222, filed on Oct. 8, 2014.

(51) Int. Cl.
*H04L 12/26* (2006.01)
*H04W 52/02* (2009.01)

(52) U.S. Cl.
CPC ..... *H04W 52/0216* (2013.01); *H04W 52/028* (2013.01); *Y02D 70/00* (2018.01); *Y02D 70/1262* (2018.01); *Y02D 70/146* (2018.01); *Y02D 70/164* (2018.01); *Y02D 70/23* (2018.01); *Y02D 70/24* (2018.01); *Y02D 70/25* (2018.01)

(58) Field of Classification Search
USPC ....... 370/229, 230, 235, 236, 252, 328, 329, 370/330
See application file for complete search history.

(56) References Cited

U.S. PATENT DOCUMENTS

| | | | | |
|---|---|---|---|---|
| 6,959,198 B2 * | 10/2005 | Mitsugi | .................... | G04G 5/00 368/13 |
| 7,831,209 B2 * | 11/2010 | Yasuda | .................... | H04S 1/005 455/426.1 |
| 2001/0016496 A1 * | 8/2001 | Lee | ........................ | H04W 72/14 455/450 |
| 2005/0227732 A1 * | 10/2005 | Hiraki | ............... | H04W 36/0094 455/561 |
| 2009/0104880 A1 * | 4/2009 | Abe | ........................ | H04W 8/22 455/73 |
| 2011/0090810 A1 * | 4/2011 | Park | ........................ | H04L 1/1854 370/252 |
| 2013/0162442 A1 * | 6/2013 | Honda | .................... | G08C 17/02 340/870.02 |

(Continued)

*Primary Examiner* — Kwang B Yao
*Assistant Examiner* — Nguyen Ngo
(74) *Attorney, Agent, or Firm* — McClure, Qualey & Rodack, LLP

(57) ABSTRACT

A timing control method for a user equipment (UE) in a wireless communications system, including: obtaining a starting time of a data transmission period from information of a data transmission timing received from a base station of a wireless network; obtaining a starting time of a current data processing period; and adjusting a data processing timing so that the adjusted starting time of the current data processing period is ahead of the starting time of the data transmission period by a predetermined time.

40 Claims, 11 Drawing Sheets

(56) References Cited

U.S. PATENT DOCUMENTS

| | | | |
|---|---|---|---|
| 2013/0301858 A1* | 11/2013 | Pedersen | H04R 25/554 381/315 |
| 2014/0066079 A1* | 3/2014 | Murakami | H04W 56/003 455/450 |
| 2015/0289205 A1* | 10/2015 | Kim | H04W 52/0216 370/311 |
| 2017/0013565 A1* | 1/2017 | Pelletier | H04W 52/146 |

* cited by examiner

TIMING CONTROL METHOD AND COMMUNICATION DEVICE

CROSS REFERENCE TO RELATED APPLICATIONS

The present application is based on and claims the benefit of U.S. Provisional Application No. 62/061,222 filed on Oct. 8, 2014, the entirety of which is incorporated by reference herein.

TECHNICAL FIELD

Aspects of the present invention relate generally to methods for wireless communications systems and, more particularly, to a timing control method for a user equipment (UE) and a communication device in a wireless communications system.

BACKGROUND

Wireless communications systems are rapidly growing in usage. In recent years, wireless devices such as smartphones and tablet computers have become increasingly sophisticated. In addition to supporting telephone calls, many mobile devices now provide access to the Internet, email, text messaging, and navigation using the global positioning system (GPS), and are capable of operating sophisticated applications that utilize these functionalities. In general, wireless communication technologies, such as cellular communication technologies, are substantially designed to provide mobile communication capabilities to wireless devices generally powered by a portable power supply, e.g., a battery. Batteries hold a finite charge, and so in order to improve the battery life of a wireless device, one approach is to reduce the power consumption required to perform wireless communications. Accordingly, some wireless communication technologies implement features designed to conserve power while still providing a high-quality user experience. Generally speaking, portions of circuitry in a wireless device may be powered down when not in use in order to save power and conserve battery life.

Several voice services technologies are available. For example, according to voice over LTE (VoLTE), data can be received and transmitted at time points according to allocation of base stations. In addition, many allocation methods have been developed for saving power in transmitting and receiving audio/speech data, such as discontinuous reception (or DRX), semi-persistent scheduling (SPS), and scheduling request (SR).

In this regard, communication devices and timing control methods are needed that are capable of improving the performance and power consumption in a communications system.

SUMMARY

A detailed description is given in the following embodiments with reference to the accompanying drawings.

A timing control method and a communication device in communications systems are provided.

According to an aspect, a timing control method is disclosed for a user equipment (UE) in a wireless communications system, comprising: obtaining a starting time of a data transmission period from information of a data transmission timing received from a base station of a wireless network; obtaining a starting time of a current data processing period; and adjusting a data processing timing so that the adjusted starting time of the data processing period is ahead of the starting time of the data transmission period by a predetermined time.

According to another aspect, a communication device is disclosed. The communication device comprises: a reception/transmission unit; a data processing unit; a processor, configured to execute a program code stored in a memory to process the following: obtaining a starting time of a data transmission period from information of a data transmission timing received by the reception/transmission unit from a base station of a wireless network; obtaining a starting time of a current data processing period; adjusting a data processing timing so that the adjusted starting time of the data processing period is ahead of the starting time of the data transmission period by a predetermined time; and providing the adjusted data processing period to the data processing unit such that the data processing unit performs data processing according to the adjusted data processing timing.

According to further another aspect, a timing control method for a user equipment (UE) in a wireless communications system, comprising: obtaining a data transmission timing from a base station of a wireless network; obtaining a data processing timing according to the data transmission timing and processing data according to the data processing timing; adjusting the data processing timing according to the data transmission timing; and sending a notification signal for triggering data transmission at a respective starting point of each of one or more data processing periods defined in the adjusted data processing timing.

One improvement of the embodiments is to solve a problem of power wasting occurring due to nonalignment of a data processing period and a data transmission period. Conventionally, after a UE finishes processing data, the UE probably cannot immediately transmit the processed data because the data generation may be finished either too early (before a starting time of a data transmission period) or too late (after the data transmission period has already begun). The embodiments, by adjusting a starting time of the data processing period to be ahead of a starting time of the data transmission period by a predetermined time, eliminating the nonalignment of the data processing period and the data transmission period, thereby reducing power consumption.

A detailed description is given in the following embodiments with reference to the accompanying drawings.

DRAWINGS

In the drawings, like reference characters generally refer to the same parts throughout the different views. The drawings are not necessarily to scale, emphasis instead generally being placed upon illustrating the principles of the aspects of this disclosure. In the following description, various aspects of this disclosure are described with reference to the following drawings, in which.

Figure 9A:
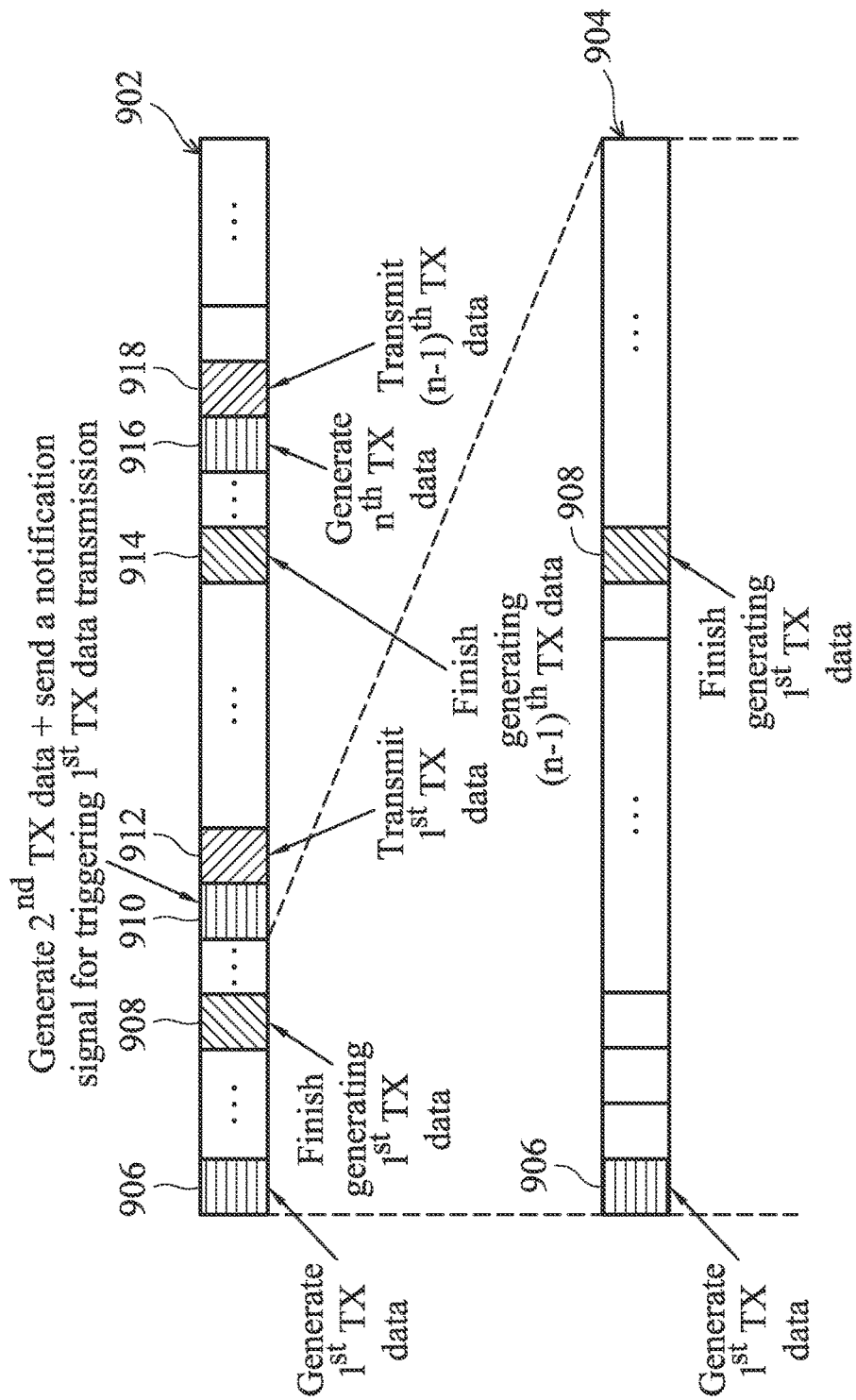
Figure 9B:
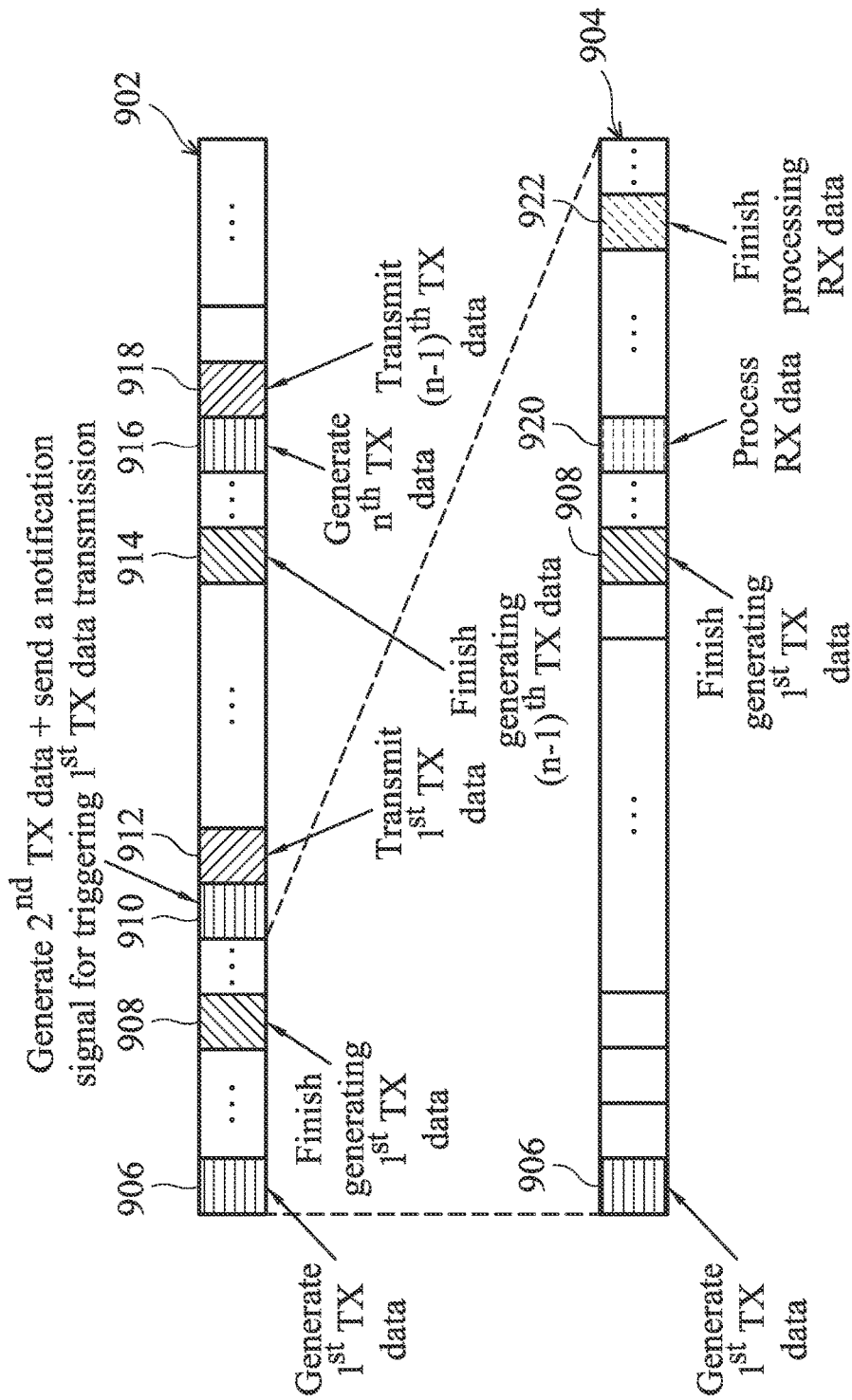

FIGS. 9A~9B are diagrams illustrating examples of data transmission timing and data processing timing in accordance with one embodiment of the invention.

DETAILED DESCRIPTION

Embodiments of the disclosure provide a method for adjusting a data processing timing at a user equipment (UE) based on a data transmission timing received from a base station. Notification signals for triggering data transmission can be sent based on the adjusted data processing timing. The embodiments can adjust a starting time of the data processing period to be ahead of a starting time of the data transmission period by a predetermined time, thus eliminating the nonalignment of the data processing period and the data transmission period, thereby reducing power consumption.

In some embodiments, a notification signal can be sent at a starting time of a data processing period later than an adjusted starting time of a current data processing period. This embodiment can reduce control complexity and therefore can be implanted easily.

Several exemplary embodiments of the application are described with reference to FIG. 1 to FIG. 6B, which generally relate to a timing control method for a UE and a communication device in a communications system.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3rd Generation Partnership Project (3GPP) specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., a Local Area Network (LAN), the Internet, etc.) for wireless communication devices. The term "communication device" may be used to denote a wireless communication device and/or a base station.

Figure 1:
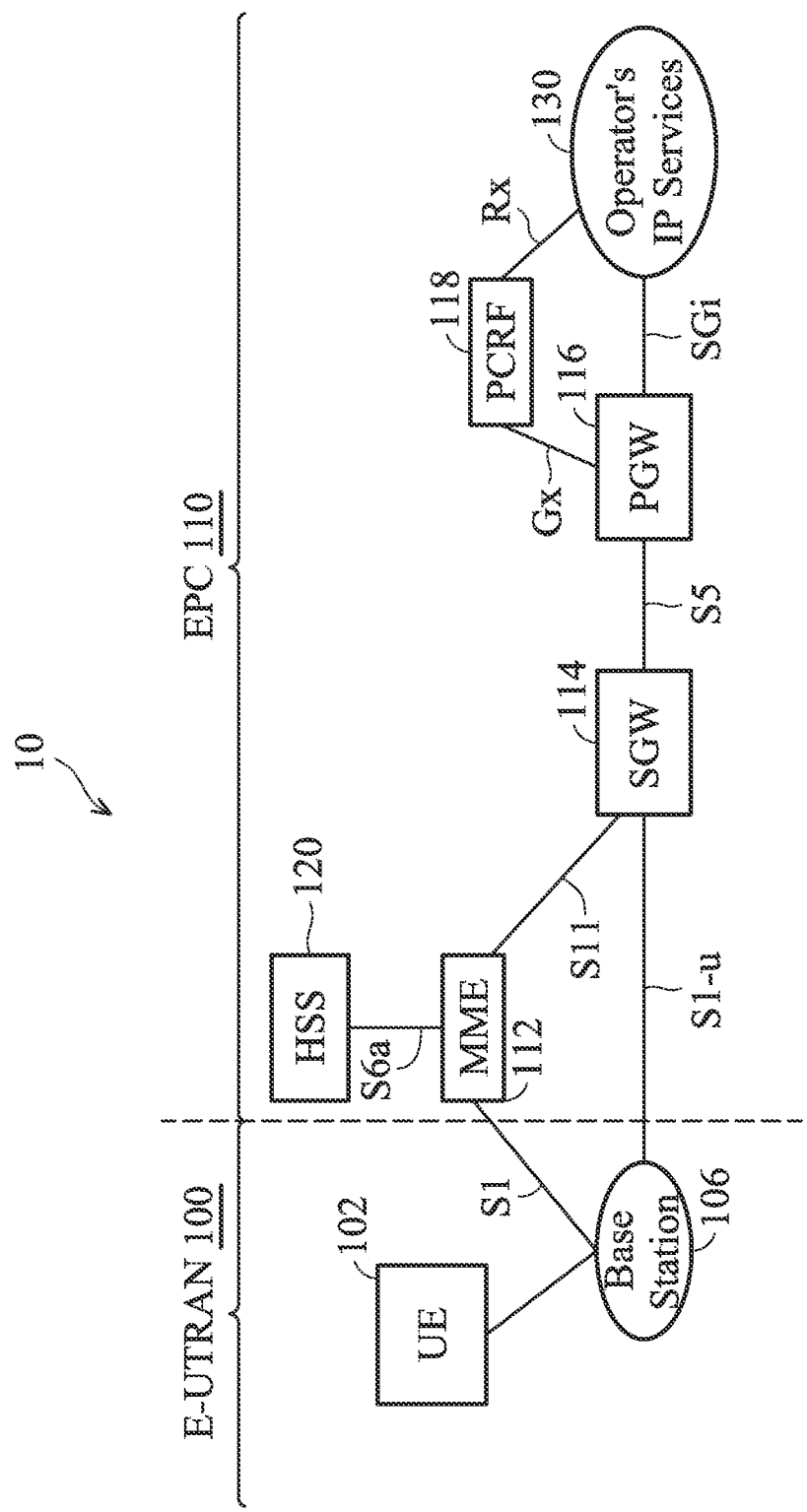
FIG. 1 illustrates an LTE network architecture diagram according to an embodiment of the present invention.

FIG. 1 illustrates an LTE network architecture diagram 10 according to an embodiment of the present invention. The LTE network architecture 10 may be referred to as an Evolved Packet System (EPS) 10. The EPS uses the concept of "EPS bearers" to route IP traffic from a gateway in the PDN to the UE. A bearer is an IP packet flow with a specific Quality of Service (QoS) between the gateway and the UE. In FIG. 1, an EPS 10 includes a UE 102, an Evolved Universal Terrestrial Radio Access Network (E-UTRAN) 100 and an Evolved Packet Core (EPC) 110.

The E-UTRAN 100 includes one or more evolved Node-Bs (eNB), base stations 106, which provides a user plane and a control plane and the base station 106 communicates with the UE 102 via LTE-Uu interfaces. The core network, the EPC 110, controls the UE 102 and manages establishment of the bearers, and includes a Mobility Management Entity (MME) 112, a serving gateway (SGW) 114, a packet data network gateway (PGW) 116, a Policy and Charging Rules Function (PCRF) 118, a Home subscriber Server (HSS) 120, etc. The MME 112, the SGW 114, and the PGW 116 can be implemented in a gateway box. In some embodiments, the SGW 114 and PGW 116 can be implemented on separate network devices.

The MME 112 provides mobility management and session management on UEs by control plane signaling using Non-Access Stratum (NAS) protocols where the NAS packets are transported over S1-MME interfaces between the MME 112 and the base station 106. The MME 112 and the SGW 114 communicate with each other via a S11 interface. The SGW 114 forwards and receives packets to and from the base station 106 via an S1-u interface. The S1-u interface supports per-bearer user plane tunneling and inter-BS path switching during handover.

The PGW 116 is connected to an external packet network (e.g., the Internet or operator's IP service center 130) via a SGi interface and is connected to the SGW 114 via an S5 interface. The PGW 116 serves IP address allocation for the UEs, as well as QoS enforcement and flow-based charging according to rules from the PCRF 118. The PGW 116 also serves as the mobility anchor for interworking with non-3GPP technologies such as CDMA2000 and WiMAX networks.

The PCRF 118 serves to perform policy control decision-making, as well as controlling the flow-based charging functionalities. In addition, the PCRF 118 communicates with the PGW 116 via a Gx interface, and with the operator's IP service center 130 via an Rx interface. The HSS 120 is connected to the MME 112 via an s6a interface and stores subscriber data for each subscriber in the EPS 10.

In addition, the base station 106 can facilitate the UE 102 communication with the EPC 110 to receive wireless network services, such as circuit-switched (CS) voice services, packet-switched (PS) voice services including voice-over-Internet protocol (VoIP), other data services, and the like.

Figure 2:
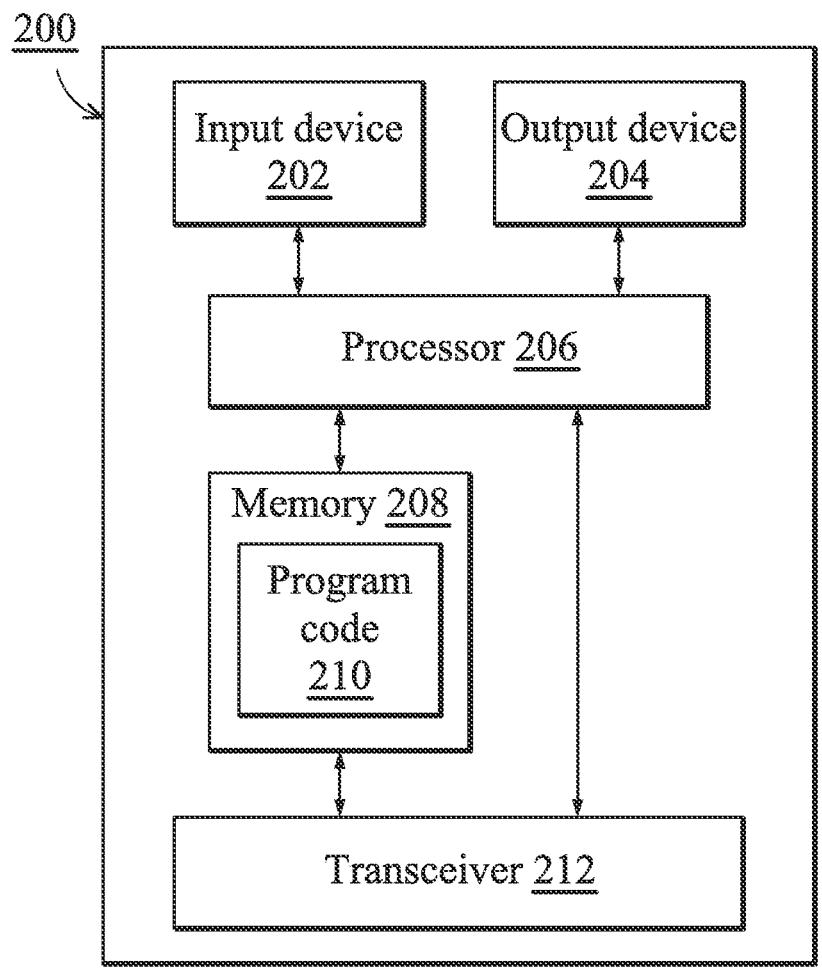
FIG. 2 is a functional block diagram of a communications device according to one embodiment of the present invention.

FIG. 2 is a functional block diagram of a communications device 200 according to one embodiment of the present invention. As shown in FIG. 2, the communications device 200 can be the UE 102 of FIG. 1 but is not limited thereto. In addition, the communications device 200 is preferably used in the LTE system, the LTE-A system or any other similar wireless communications system but is not limited thereto.

In the embodiment, the communications device 200 may include an input device 202, an output device 204, a processor 206, a memory 208, a program code 210, and a transceiver 212. The processor 206 can be a Central Processing Unit (CPU), a microprocessor, or an Application Specific Integrated Circuit (ASIC) which is able to execute the program code 210 in the memory 208 and transmit the processing results to the transceiver 212 to be transmitted on the air. The communications device 200 can receive signals input by a user through the input device 202, such as a keyboard keypad, touch screen, or microphone (for voice input), and can output images and sounds through the output device 204, such as a screen or speakers. The signal input/output from and to the input device 202 and output device 204 can also be processed by the processor 206. The transceiver 212 is used to receive and transmit radio signals.

Figure 3:
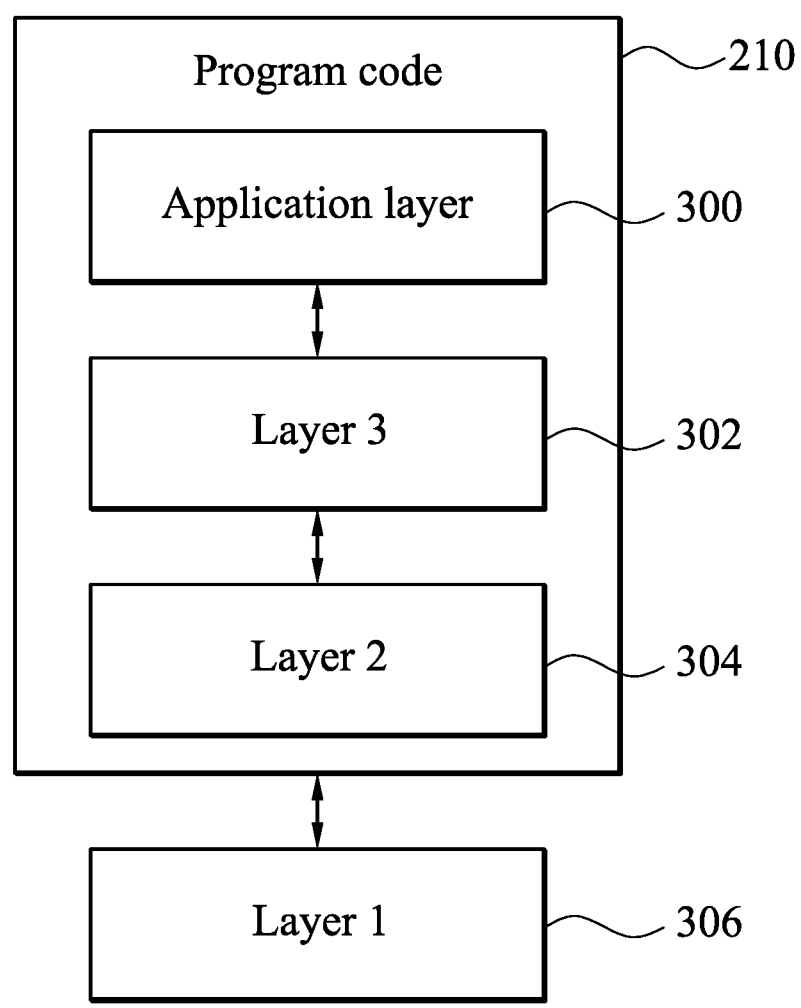
FIG. 3 is a simplified block diagram of the program code shown in FIG. 2 in accordance with one embodiment of the invention.

FIG. 3 is a simplified block diagram of the program code 210 shown in FIG. 2 in accordance with one embodiment of the invention. In this embodiment, the program code can include multiple layers. The multiple layers for example, can include an application layer 300, a Layer 3 portion 302, and a Layer 2 portion 304, and can communicate with a Layer 1 portion 306. The multiple layers can be responsible for different jobs/functions. For example, the Layer 3 portion 302 generally performs radio resource control, the Layer 2 portion 304 generally performs link control, and the Layer 1 portion 306 generally performs physical connections. In addition, each layer can include more sub-layers. For example, for LTE or LTE-A systems, the Layer 2 portion may include a Radio Link Control (RLC) sub-layer and a Medium Access Control (MAC) sub-layer. The Layer 3 portion may include a Radio Resource Control (RRC) sub-layer.

In the following, aspects of this disclosure are described in more detail in context of the LTE communication system as an exemplary underlying architecture and the disclosure is not limited to the LTE communication system.

LTE has been designed to address the need for mobile Internet access. Internet traffic can be characterized by its high burstiness with high peak data rates and long silence periods. According to one aspect of this disclosure, in accordance with LTE, in order to allow for battery savings of the UE 102, the EPS 10 supports DRX (discontinuous reception). According to LTE, two DRX periods can be supported, which are referred to as short DRX and long DRX, respectively, for the downlink direction (form the base station 106 to the UE 102). On the other hand, according to LTE, for the reverse link, i.e. uplink direction (from the UE 102 to the base station 106), the EPS 10 supports DTX (discontinuous transmission), specifically, either or both of SR (scheduling request) and SPS (semi-Persistent scheduling). For example in the SR case, the UE 102 may report its uplink buffer status to the base station 106 which then schedules and assigns uplink communication resources, specifically resource blocks (RBs), to the UE 102.

In the following, it is assumed that the UE 102 has a speech connection (specifically a Voice over LTE (VoLTE) connection in this example, or more generally a VoIP connection), e.g. to another UE which may use the same communication network or another communication network connected to the communication network. The VoLTE connection uses a communication connection between the UE 102 and the base station 106 to exchange data between the UE 102 and the network side.

Figure 4:
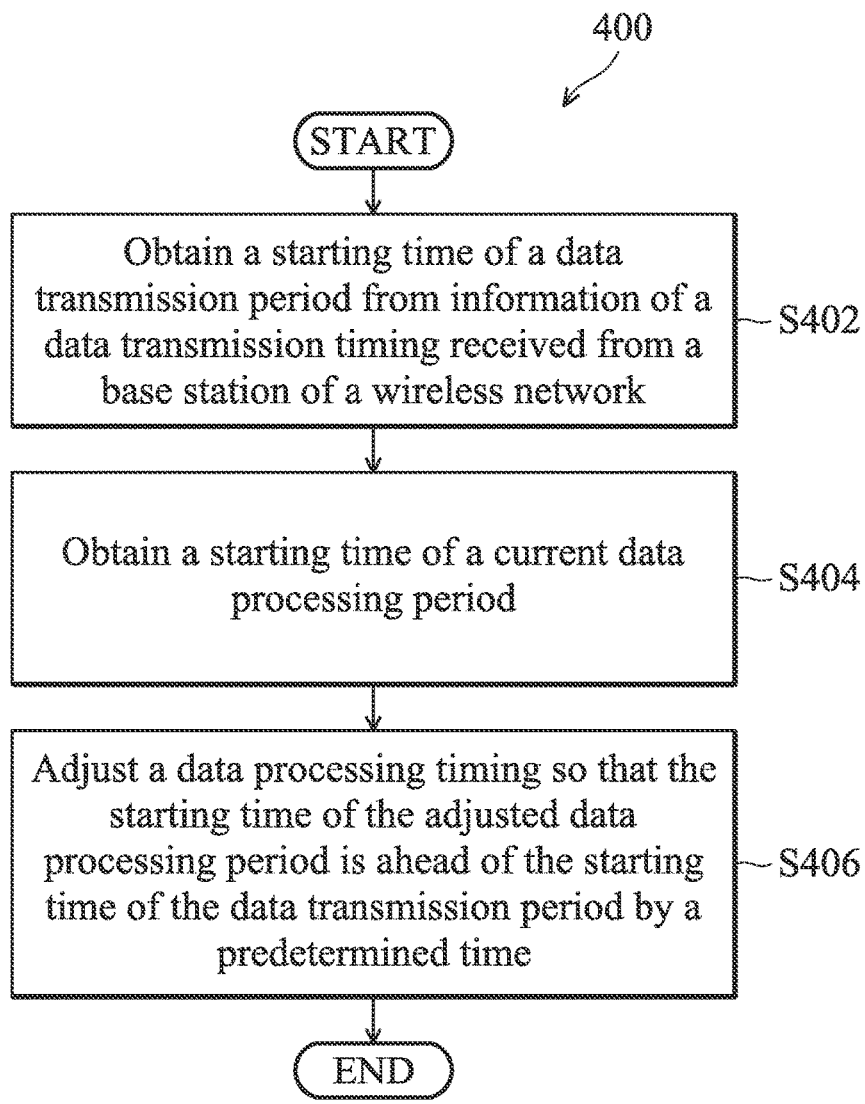
FIG. 4 shows a flow diagram illustrating a timing control method for a user equipment (UE) in a wireless communications system in accordance with one embodiment of the invention.

FIG. 4 shows a flow diagram illustrating a timing control method 400 for a user equipment (UE) in a wireless communications system in accordance with one embodiment of the invention.

The timing control method 400 may include one or more operations, actions, or functions as represented by one or more of blocks S402, S404, and S406. Although illustrated as discrete blocks, various blocks may be divided into additional blocks, combined into fewer blocks, or eliminated, depending on the desired implementation.

The timing control method 400 may be implemented in the LTE network architecture 10 in FIG. 1 or other network architectures, one or more components of the communications device 200 in FIG. 2 or other communication device, and/or or one or more components of the program code 210 in FIG. 3 or other program codes. For illustrative purposes, the operations described below are performed by the embodiments shown in FIGS. 1-3 but the disclosure is not limited thereto. The timing control method 400 may begin at step S402. In the following, the term "timing" may be an absolute or relative timing.

In step S402, the UE obtains a starting time of a data transmission period from information of a data transmission timing received from a base station of a wireless network. For example, the information may be carried in SR or SPS information in a LTE system.

In addition, the data transmission timing may include information of the data transmission period and a starting time of a data transmission period which may be the same or different the starting time of the data transmission period to be referred to in the following step.

In other words, the starting time of the data transmission period received from the base station of a wireless network may be suitable for being directly applied to the following steps and therefore can be directly served as the starting time of the data transmission period used in the following steps.

However, in some situations, a starting time of a data transmission period received from the base station of the wireless network may be not be suitable for being directly applied in the following steps because the received starting time of the data transmission period is too far from the starting time of the current data processing period. In these situations, the processor 206 may need to calculate the starting time of the data transmission period to be referred to in the following steps by adding one or more data transmission periods to the received starting time of the data transmission period. In other words, the received starting time of the data transmission period is ahead of the starting time of the data transmission period used in the following steps by a time length of one or more data transmission periods.

In step 404, the UE obtains a starting time of a current data processing period. In one embodiment, the data processing may include an encoding processing, for example. In one embodiment, the data may be audio/speech data.

In a specific example where the data is audio/speech data, the data processing may be implemented by a data processing unit such as an audio DSP (digital signal processing) circuit, a controlling unit such as a microcontroller (MCU), and a transceiver. In more detail, the DSP may execute either or both of an encoding process and a decoding process on the audio/speech data. On the other hand, the processing on the MCU may be implemented by one or more of following stages: a speech driver, PSR, and multiple protocol layers, and a link layer such as MAC (media access control) for initializing the transceiver for transmitting the audio/speech data. The transceiver, which is a transmission/reception unit, may be a PHY (physical layer), may include the RF, mixedsignal and analog portions. In the specific example, the starting time of a current data processing period may be a time when the DSP starts to encode the audio/speech data.

In step 406, the UE adjusts a data processing timing so that the starting time of the adjusted data processing period is ahead of the starting time of the data transmission period by a predetermined time. In some embodiments, the predetermined time may be set by considering execution times and delays in different stages of the data processing after the audio DSP finishes processing on the audio/speech data. Using the specific example describe in step 404 for purpose of explanation only, the data processing may include at least following times and delays: execution times and delays in the MCU. The execution times and delays in the MCU may include an execution time of the speech driver, PSR to MAC delay, and a time for the MAC to initialize the transceiver to request a grant for transmitting data. And after step 406, the adjusted starting time of the data processing period can be close to the starting time of the data transmission period. For example, the predetermined time may be set so that after the adjustment, the initialization of the transceiver can be finished at the starting time of the data transmission period.

It is noted that step 402 (at least a part thereof) may not be required to be performed repeatedly. Once the UE is informed by the base station of the wireless network about a starting time of a data transmission period, the UE can obtain respective starting times of data transmission periods later than the data transmission period for comparison with different data processing periods by adding a time length of one or more data transmission periods.

It is also noted that the predetermined time used in step 406 may be a constant or a variable. In some embodiment, the starting time of the data transmission period is varied for comparison with different starting times of different data processing periods, and the predetermined time may include execution times and delays in different stages of the data processing. In some other periods where the starting time of the data transmission period is a constant for comparison with different starting times of different data processing periods, the predetermined time may additionally include one or more data transmission periods.

In one embodiment, the UE may send a notification signal for triggering data transmission at the starting point of a later data processing period in the timing control method 400. The later data processing period can be one or more data processing periods after the adjusted starting time of the current data processing period obtained in step S406. This embodiment can reduce control complexity and therefore can be implanted easily.

Using the specific example of data processing described in step S406 for explanation only, prior to sending the notification signal to the MAC layer, the audio DSP of the UE can start to process, which as described, may include encoding the data, at the adjusted starting time of the current data processing period obtained in step S406. In other words, the audio DSP of the UE can send the notification signal at the starting point of the later data processing period for triggering transmission of data, wherein the transmitted data has been processed with a data processing started from the adjusted starting time of the current data processing period. Then, the MAC layer of the UE can initialize a digital process on the processed data in the transceiver, causing the transceiver to send a signal to the base station for requesting a grant.

Next, the MAC layer of the UE may receive a signal indicating the grant from the base station. In response to the received signal, the transceiver of the UE transmits the processed data.

Referring to FIGS. 2 and 3 together, the communications device 200 includes a program code 210 stored in the memory 208 for control an operating timing of the UE. In one embodiment, the processor 206 could execute program code 210 to enable the UE to perform the example flow in FIG. 4: (i) to obtain a starting time of a data transmission period from information of a data transmission timing received from a base station of a wireless network, (ii) to obtain a starting time of a current data processing period, and (iii) to adjust a data processing timing so that the starting time of the current data processing period is ahead of the starting time of the data transmission period by a predetermined time. In addition, the processor 206 can execute the program code 20 to perform all of the above and other actions or steps described herein.

The relationship between the data transmission period and the data processing period is discussed in more details using the following two cases:

Case 1:

In Case 1, the length of the data transmission period is equal to the length of the data processing period. The starting time of the later data processing period can be arranged to be one data processing period after the adjusted starting time of the current data processing period. In addition, the data processing unit of the UE can be configured to send a notification signal at the respective starting point of each data processing period. In addition, the notification signal can be sent for triggering transmission of the data processed during the current data processing period.

Figure 5A:
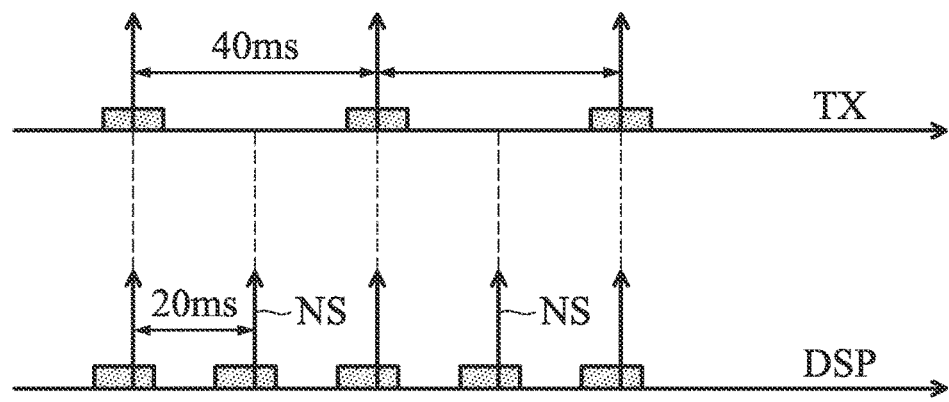
FIG. 5A shows a schematic diagram illustrating the data transmission period and the data processing period in case 2 in accordance with one embodiment of the invention.
Figure 5B:
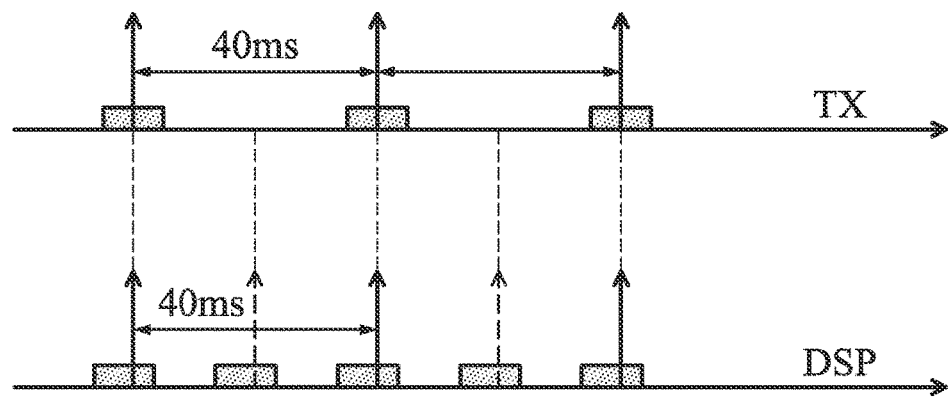
FIG. 5B shows a schematic diagram illustrating the data processing period is adjusted in case 2 in accordance with one embodiment of the invention.

Case 2:

In Case 2, the length of the data transmission period is multiple times the length of the data processing period. For example, it is assumed that the data transmission period is 40 ms, and the data processing period is 20 ms, as shown in FIGS. 5A and 5B. In both of FIGS. 5A and 5B, the upper parts indicate the data transmission timing according to which the transceiver can transmit data, and the lower parts indicate the data processing timing according to which the DSP can process data.

In the embodiment of FIG. 5A, the data processing unit of the UE can be configured to send a notification signal at the respective starting point of each data processing period. In other words, the starting time of the later data processing period can be arranged to be one data processing period after the adjusted starting time of the current data processing period in the embodiment of FIG. 5A. Furthermore, the notification signal can be sent for triggering transmission of data, wherein the data to be transmitted comprises data processed during the current data processing period in the embodiment of FIG. 5A. This is an undesired implementation since the transceiver is awaked in response to the notification signal NS but cannot transmit data.

In comparison, in the embodiment of FIG. 5B, the data processing unit of the UE can be configured to send a notification signal at the respective starting points of some rather than all of the data processing periods. The some data processing periods can be those closer to the start points of data transmission periods. In other words, the starting time of the later data processing period can be arranged to be one or more data processing periods after the adjusted starting time of the current data processing period in embodiment of FIG. 5B. Furthermore, the data to be transmitted comprises either or both of data processed during the current data processing period and data processed during one or more data processing periods between the current data processing period and the later data processing period in the embodiment of FIG. 5B. Compared to the embodiment of FIG. 5A, this implementation is more desired due to saving more power.

Figure 6A:
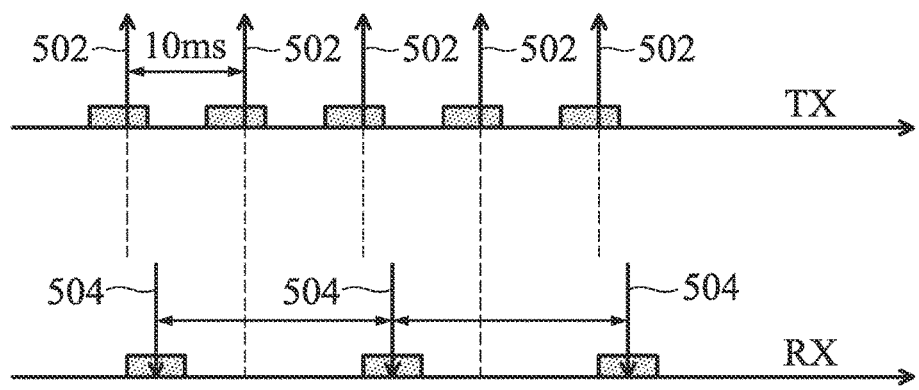
FIG. 6A shows a schematic diagram illustrating the data transmission timing and the data reception timing are aligned in accordance with one embodiment of the invention.

It is also noted that in another embodiment, the UE may further receive information of a data reception timing from the base station of the wireless network. In some embodiments, the data transmission timing and the data reception timing may further be aligned to save the UE's power. More details will be illustrated in FIGS. 6A-6C. In each of FIGS. 6A-6C, the upper part indicates a data transmission timing according to which the transceiver can transmit data, and the lower part indicates a data reception timing according to which the transceiver can receive data. As shown in FIG. 6A, it is assumed that the data reception period is two times the data transmission period. For example, the data transmission period is 10 ms, and the data reception period is 20 ms. The transceiver in the UE can be wakened at the starting points of data transmission periods 502 to transmit data in response to notification signals for transmitting data as illustrated by arrows. In addition, the transceiver in the UE can be wakened according to the data reception times 504 to receive data at reception times as illustrated by arrows. There are two choices to choose the starting points of data transmission periods as illustrated in examples of FIGS. 6B and 6C. As will be shown, to save more power, the data can be preferably transmitted at time points near data reception times.

Figure 6B:
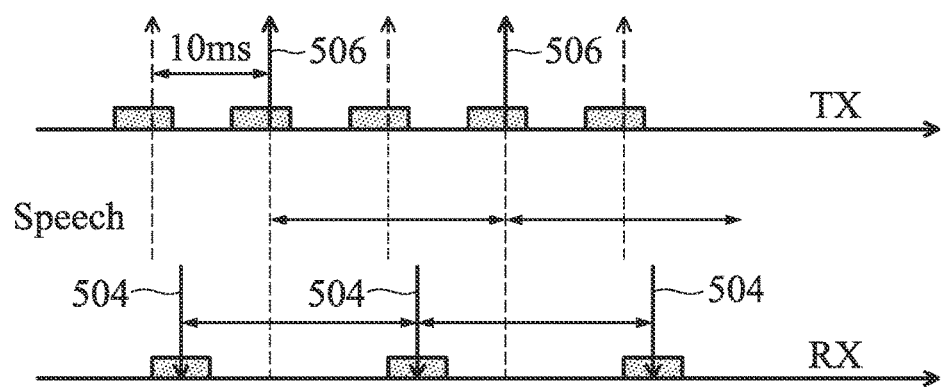
FIG. 6B shows a schematic diagram illustrating the starting points of data transmission periods are chosen in choice I in accordance with one embodiment of the invention.

Choice I:

In FIG. 6B, the starting points of data transmission periods 506 are chosen to be between starting points of data reception periods 504. However, this choice causes that the UE has to be awaken at the starting points of data transmission periods 506 and the start points of periods of data reception 504 again. Therefore, choice I is not a good idea to use Choice I for saving the UE's power.

Figure 6C:
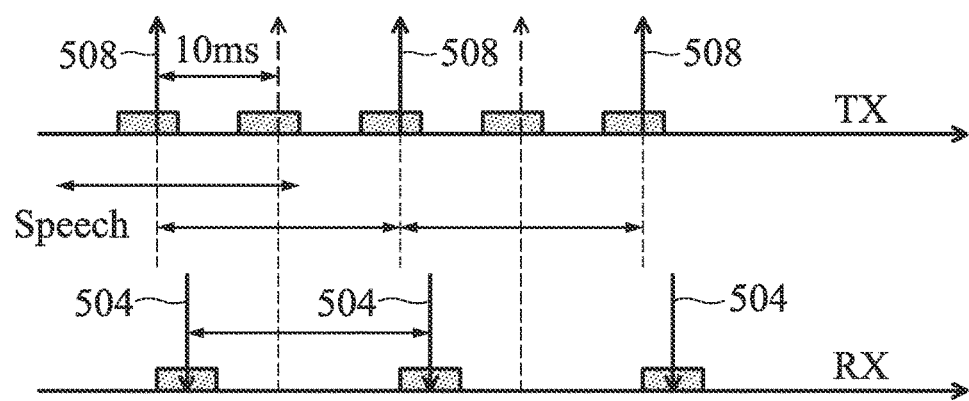
FIG. 6C shows a schematic diagram illustrating the starting points of data transmission periods are chosen in choice II in accordance with one embodiment of the invention.

Choice II:

In FIG. 6C, the data transmission timings 508 are chosen to be close to starting points of data reception periods 504. In Choice II, the UE only needs to be wakened at part of the starting points of data transmission periods 508 that are close to the start points of data reception periods 504. Since the number to awake the UE is reduced compared to choice I, the UE can save more power in choice II.

Figure 7:
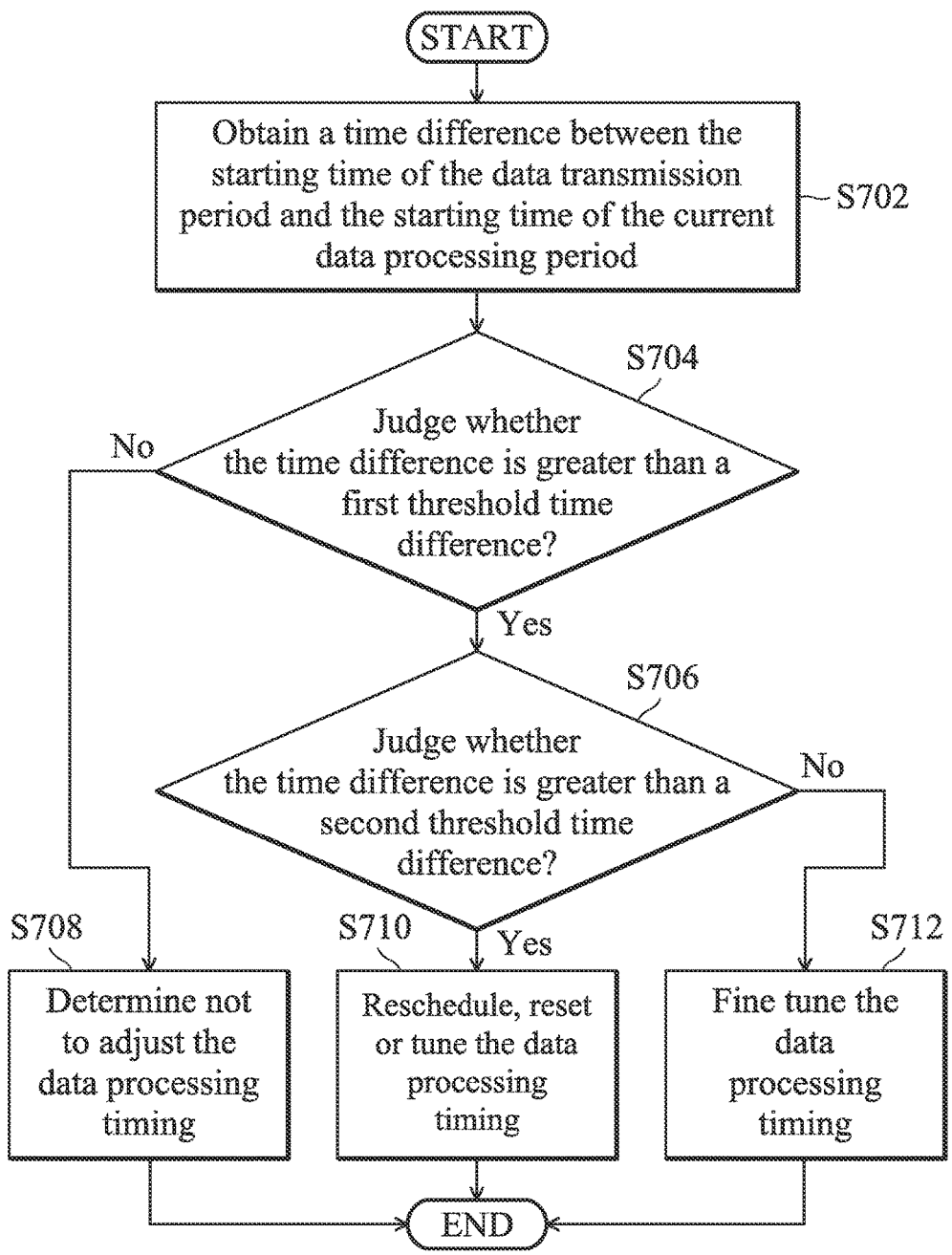
FIG. 7 shows a flow diagram illustrating the UE adjusting the data processing timing in accordance with one embodiment of the invention.

FIG. 7 shows an example flow diagram illustrating the UE adjusting the data processing timing in accordance with one embodiment of the invention. FIG. 7 can be applied to the method 400 illustrated with FIG. 4 but is noted limited thereto. Specifically, the example flow of FIG. 7 can be inserted between step S404 and S406 of FIG. 4, for example. In the embodiment of FIG. 7, the UE can determine whether and/or how to adjust the data processing timing according to the difference between the starting time of the data transmission period and the starting time of the current data processing period.

It is noted that the difference between the starting point of data transmission period and the starting point of the data processing period can be monitored in real time. And the adjustment may be performed if necessary and in a suitable way as required by design. For different magnitudes of the differences, the same or different adjustment mechanisms may be performed. In some embodiments such as the embodiment of FIG. 7, for a larger difference, the data processing timing can be rescheduled, for example. Conversely, for a smaller difference, the data processing timing can be fine tuned. To achieve this, two different threshold time differences may be required to be compared with the difference.

In step S702, the UE obtains a time difference between the starting time of the data transmission period and the starting time of the current data processing period. In step S704, the UE judges whether the time difference is greater than a first threshold time difference. If the time difference is greater than the first threshold time difference ("Yes" in step S704), the flow proceeds to step S706, where the UE further judges whether the time difference is greater than a second threshold time difference. The second threshold time difference may be greater than the first threshold time difference. If the time difference is less than the first threshold time difference ("No" in step S704), the flow proceeds to step S708 where the UE determines not to adjust the data processing timing.

However, if in step S706, the time difference is greater than the second threshold time difference ("Yes" in step S706), meaning a larger difference, the UE can reschedule, reset or tune the data processing timing in step S710.

If the time difference is less than the second threshold time difference and greater than the first threshold time difference ("No" in step S706), meaning a smaller difference, in step S712, the UE can fine tune the data processing timing.

It is noted that in the embodiment of FIG. 7, two different threshold time differences are used to be compared with the difference between the starting time of the data transmission period and the starting time of the data processing period. And for different magnitudes of the difference, different adjustment methods can be performed. However, in other different embodiments, the data processing can be adjusted by the same method (e.g., resetting or tuning) for different magnitudes of the difference. In such embodiments, one threshold time difference may be required, meaning that the same adjustment is performed when the difference is greater than the threshold time difference. Alternatively, no threshold time difference may be required, meaning that the adjustment can be performed regardless of the magnitude of the difference unless it is zero.

It is noted when the adjustment in performed on the data processing periods for processing TX data, data processing periods for processing RX data can be arranged accordingly.

Figure 8:
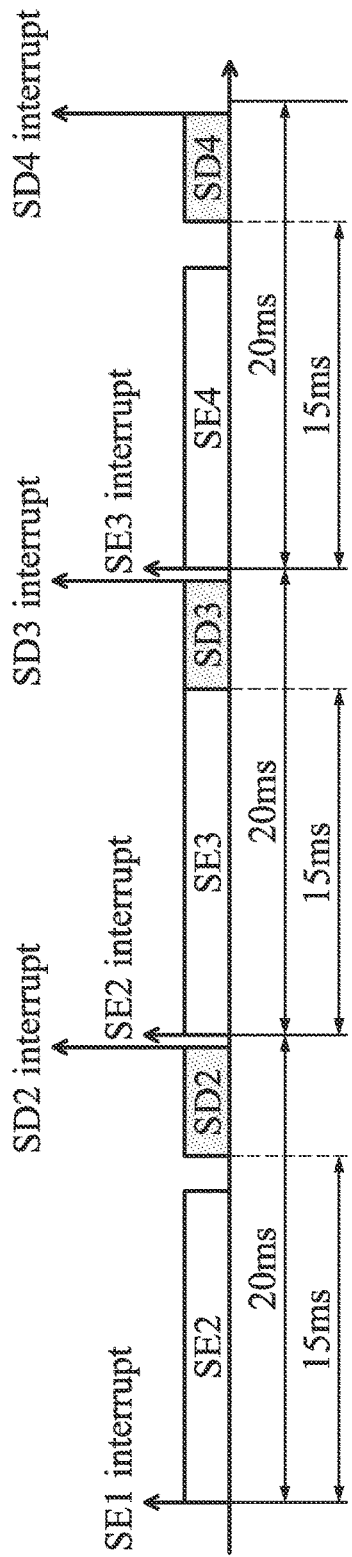
FIG. 8 is a diagram of two data processing periods in accordance with one embodiment of the invention.

FIG. 8 is a diagram of two data processing periods in accordance with one embodiment of the invention. In the embodiment, a plurality of first data processing periods (SE2, SE3, SE4 . . . ) adjusted with the data transmission timing are related to a first data processing, e.g., an encoding process on TX data. And a plurality of second data processing periods (SD2, SD3, SD4, . . . ) related to a second data processing, e.g., a decoding process on RX data, can be arranged to adapt to the adjusted data processing timing.

For example as shown, the second data processing periods (SD2, SD3, SD4, . . . ) can be arranged between the first data processing periods (SE2, SE3, SE4 . . . ), respectively. Specifically, a respective starting time of each of the second data processing periods can be later than an adjusted starting time of a corresponding first data processing period, by a certain time length (15 ms for example). In addition, first notification signals for the first data processing (SE1 interrupt, SE2 interrupt, SE3 interrupt, . . . ) can be sent at adjusted starting times of the first data processing periods (SE2, SE3, SE4 . . . ), and second notification signals (SD2 interrupt, SD3 interrupt, . . . ) for the second data processing can be sent at adjusted finishing times of the second data processing periods (SD2, SD3, . . . ). In this way, the first and second notification signals can arise at almost the same time and processed in a small time interval.

FIGS. 9A~9B are diagrams illustrating examples of data transmission timing and data processing timing in accordance with one embodiment of the invention. The examples of FIGS. 9A~9B may be achieved by using the timing control method of FIG. 4 but is not limited thereto. In the data transmission diagrams of FIGS. 8A~9B, time increases from left to right.

In FIG. 9A, there are a data transmission timeline 902 and a bottom timeline 904. The data transmission timeline 902 illustrates that the UE processes and transmits TX data, and the bottom timeline 904 illustrates that the UE only processes TX data in a data processing period. The UE may start to process data for transmission (i.e., generate TX data) at the starting time of the current data processing period (906, 910 or 916), and finish processing/generating the TX data at a finishing time (908 or 914). In addition, the UE may send a notification signal for triggering data transmission and start to process/generate next TX data at the starting time of a latter data transmission period (906, 910 or 916).

Using the specific example of data processing for explaining more details, at time 906 of FIG. 9A, the audio DSP of the UE can start to process $1^{st}$ TX data. After the UE obtains the starting time of the data transmission period from information of a data transmission timing received from the base station, the UE can adjust the data processing timing so that the starting time of the data processing period (906) is ahead of the starting time of the data transmission period (912) by a predetermined time. And at time 810 of FIG. 9A, the audio DSP of the UE can start to process $2^{nd}$ TX data. And at time 914, the audio DSP can send a notification signal to the MAC layer for triggering $1^{st}$ TX data transmission.

In FIG. 9B, there are the data transmission timeline 902 and a bottom timeline 904, wherein the bottom timeline 904 illustrates that the UE can process the TX data and RX data in the data processing period. Similar to the descriptions related to FIG. 9A, the processing for the RX data can be started at the starting time 920 and finished in the finishing time 922 at which a notification signal for the RX data can be sent. It can be seen that the finishing time of processing the RX data is located close to a starting time of processing $2^{nd}$ TX data at which a notification signal for transmitting the $1^{st}$ TX data is also sent. In other words, the notification signals for the RX data and the $1^{st}$ TX data are very close and can be processed in a small time interval, thus saving more power in the UE.

By adjusting the data processing timing in the embodiments, the starting time of the adjusted data processing period can be ahead of the starting time of the data transmission period by a predetermined time. Therefore, the UE may process data and transmit data at an appropriate time for saving power, and the power consumption can be reduced more than conventional power-saving techniques.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general-purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute code or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A timing control method for a user equipment (UE) in a wireless communications system, comprising:
    obtaining a starting time of a data transmission period from information of a data transmission timing received from a base station of a wireless network;
    obtaining a starting time of a current data processing period;
    adjusting a data processing timing so that the adjusted starting time of the current data processing period is ahead of the starting time of the data transmission period by a predetermined time; and
    sending a notification signal for triggering data transmission at a starting point of a later data processing period, wherein the later data processing period is one or more data processing periods after the adjusted starting time of the current data processing period,
    wherein in an event that a length of the data transmission period is equal to a length of a data processing period, the later data processing period is one data processing period after the adjusted starting time of the current data processing period.

2. The timing control method as claimed in claim 1, wherein in an event that the length of the data transmission period is equal to the length of a data processing period, the notification signal is sent at a respective adjusted starting point of each data processing period.

3. The timing control method as claimed in claim 1, wherein in an event that the length of the data transmission period is equal to the length of a data processing period, the notification signal is sent for triggering transmission of data processed during the current data processing period.

4. The timing control method as claimed in claim 1, wherein in an event that the length of the data transmission period is multiple times the length of the data processing period, the later data processing period is one or more data processing periods after the adjusted starting time of the current data processing period.

5. The timing control method as claimed in claim 1, wherein in an event that the length of the data transmission period is multiple times the length of the data processing period, the notification signal is sent at respective adjusted starting points of some data processing periods that are closer to start points of data transmission periods.

6. The timing control method as claimed in claim 1, wherein in an event that the length of the data transmission period is multiple times the length of the data processing period, the notification signal is sent for triggering transmission of data, wherein the data to be transmitted comprises data processed during the current data processing period.

7. The timing control method as claimed in claim 6, wherein the data to be transmitted further comprises data processed during one or more data processing periods between the current data processing period and the later data processing period.

8. The timing control method as claimed in claim 1, further comprising:
    prior to the step of sending the notification signal, starting to process data at the adjusted starting time of the current data processing period.

9. The timing control method as claimed in claim 8, wherein the step of processing data comprises encoding the data.

10. The timing control method as claimed in claim 8, further comprising:
    receiving the notification signal; and
    transmitting the processed data after the notification signal is received.

11. The timing control method as claimed in claim 10, wherein the step of transmitting the processed data comprises:
    initializing a digital process on the processed data;
    sending a signal for requesting a grant from the base station after the digital processing is finished;
    receiving a signal indicating the grant; and
    sending the processed data having undergone the digital processing after the signal indicating the grant is received.

12. The timing control method as claimed in claim 11, wherein the predetermined time is set so that a finishing time of the initialization is aligned with a starting time of the data transmission period.

13. The timing control method as claimed in claim 1, further comprising:
    obtaining a time difference between the starting time of the data transmission period and the starting time of the current data processing period;
    judging whether the time difference is greater than a first threshold time difference; and
    determining whether to adjust the data processing timing according to a result of the judgment.

14. The timing control method as claimed in claim 13, wherein the step of determination comprises:
    determining to adjust the data processing timing if the time difference is greater than the first threshold time difference; and
    determining not to adjust the data processing timing if the time difference is less than the first threshold time difference.

15. The timing control method as claimed in claim 14, further comprising:
    if the time difference is greater than the first threshold time difference, judging whether the time difference is greater than a second threshold time difference, wherein the second threshold time difference is greater than the first threshold time difference; and
    determining how to adjust the data processing timing according to a result of the judgment.

16. The timing control method as claimed in claim 15, wherein if the time difference is greater than the second threshold time difference, resetting or adjusting the data processing timing.

17. The timing control method as claimed in claim 15, wherein if the time difference is less than the second threshold time difference and greater than the first threshold time difference, fine tuning the data processing timing.

18. The timing control method as claimed in claim 1, wherein in the step of obtaining the starting time of the data transmission period, the starting time of the data transmission period is directly received from the base station of the wireless network.

19. The timing control method as claimed in claim 1, wherein the step of obtaining the starting time of the data transmission period comprises:
   obtaining the starting time of the data transmission period by adding a time length of one or more data transmission periods to a received starting time of the data transmission period from the base station of the wireless network.

20. The timing control method as claimed in claim 1, further comprising
   receiving information of a data reception timing from the base station of the wireless network; and
   in the event that the data transmission timing and the data reception timing are aligned, and the data reception period is equal to or greater than two times the data transmission period, employing some starting points of data transmission periods that are closer to start points of periods of data reception to transmit data.

21. A communication device, comprising:
   a reception/transmission unit;
   a data processing unit; and
   a processor, configured to execute a program code stored in a memory to process the following:
   obtaining a starting time of a data transmission period from information of a data transmission timing received by the reception/transmission unit from a base station of a wireless network;
   obtaining a starting time of a current data processing period; adjusting a data processing timing so that the adjusted starting time of the current data processing period is ahead of the starting time of the data transmission period by a predetermined time;
   providing the adjusted data processing period to the data processing unit such that the data processing unit performs data processing according to the adjusted data processing timing; and
   sending a notification signal for triggering the reception/transmission unit to transmit data at a starting point of a later data processing period, wherein the later data processing period is one or more data processing periods after the adjusted starting time of the current data processing period,
   wherein in the event that a length of the data transmission period is equal to a length of a data processing period, the later data processing period is one data processing period after the adjusted starting time of the current data processing period.

22. The communication device as claimed in claim 21, wherein in the event that the length of the data transmission period is equal to the length of a data processing period, the data processing unit sends the notification signal at a respective adjusted starting point of each data processing period.

23. The communication device as claimed in claim 21, wherein in the event that the length of the data transmission period is equal to the length of a data processing period, the data processing unit sends the notification signal for triggering the reception/transmission unit to transmit data processed by the data processing unit during the adjusted data processing period.

24. The communication device as claimed in claim 21, wherein in the event that the length of the data transmission period is multiple times the length of the data processing period, the later data processing period is one or more data processing periods after the adjusted starting time of the current data processing period.

25. The communication device as claimed in claim 21, wherein in the event that the length of the data transmission period is multiple times the length of the data processing period, the data processing unit sends the notification signal at respective adjusted starting points of some data processing periods that are closer to start points of data transmission periods.

26. The communication device as claimed in claim 21, wherein in the event that the length of the data transmission period is multiple times the length of the data processing period, the data processing unit sends the notification signal for triggering the reception/transmission unit to transmit data, wherein the data to be transmitted by the reception/transmission unit comprises data processed during the adjusted data processing period.

27. The communication device as claimed in claim 26, wherein the data to be transmitted further comprises data processed by the data processing unit during one or more data processing periods between the adjusted data processing period and the later data processing period.

28. The communication device as claimed in claim 26, wherein the step of processing data comprises encoding the data.

29. The communication device as claimed in claim 21, wherein the data processing unit is further configured to:
   prior to the step of sending the notification signal, start to process data at the adjusted starting time of the current data processing period.

30. The communication device as claimed in claim 29, wherein the reception/transmission unit is further configured to:
   receive the notification signal; and
   transmit the processed data after the reception/transmission unit receives the notification signal.

31. The communication device as claimed in claim 30, wherein the reception/transmission unit is further configured to:
   initialize a digital process on the processed data;
   send a signal for requesting a grant from the base station after the digital processing is finished;
   receive a signal indicating the grant; and
   send the processed data having undergone the digital processing after the reception/transmission unit receives the signal indicating the grant.

32. The communication device as claimed in claim 31, wherein the predetermined time is set so that a finishing time of the initialization is aligned with a starting time of the data transmission period.

33. The communication device as claimed in claim 21, wherein the processor is further configured to:
   obtain a time difference between the starting time of the data transmission period and the adjusted starting time of the current data processing period;
   judge whether the time difference is greater than a first threshold time difference; and
   determine whether to adjust the data processing timing according to a result of the judgment.

34. The communication device as claimed in claim 33, wherein the processor is further configured to:
   determine to adjust the data processing timing if the time difference is greater than the first threshold time difference; and
   determine not to adjust the data processing timing if the time difference is less than the first threshold time difference.

35. The communication device as claimed in claim 34, wherein the processor is further configured:
   if the time difference is greater than the first threshold time difference, judge whether the time difference is greater than a second threshold time difference, wherein the second threshold time difference is greater than the first threshold time difference; and determine how to adjust the data processing timing according to a result of the judgment.

36. The communication device as claimed in claim 35, wherein if the time difference is greater than the second threshold time difference, the processor is further configured to reset the data processing timing.

37. The communication device as claimed in claim 35, wherein if the time difference is less than the second threshold time difference and greater than the first threshold time difference, the processor is further configured to fine tune the data processing timing.

38. The communication device as claimed in claim 21, wherein in the obtaining the starting time of the data transmission period, the reception/transmission unit directly receives the starting time of the data transmission period from the base station of the wireless network.

39. The communication device as claimed in claim 21, wherein in obtaining the starting time of the data transmission period receive information of a data reception timing from the base station of the wireless network; and the reception/transmission unit obtains the starting time of the data transmission period by adding a time length of one or more data transmission periods to a received starting time of the data transmission period from the base station of the wireless network.

40. The communication device as claimed in claim 21, wherein the reception/transmission unit is further configured to:

receive information of a data reception timing from the base station of the wireless network; and in the event that the data transmission timing and the data reception timing are aligned, and the data reception period is equal to or greater than two times the data transmission period, the reception/transmission unit employs some starting points of data transmission periods that are closer to start points of periods of data reception to transmit data.

* * * * *